United States Patent [19]

Perry

[11] Patent Number: 4,713,978
[45] Date of Patent: Dec. 22, 1987

[54] AUTOMOTIVE TRANSMISSIONS OF THE ROLLING TRACTION TYPE

[75] Inventor: Forbes G. D. B. Perry, Charlbury, England

[73] Assignee: National Research Development Corporation, London, England

[21] Appl. No.: 828,851

[22] Filed: Jan. 23, 1986

[30] Foreign Application Priority Data

Jan. 30, 1985 [GB] United Kingdom ............... 8502318

[51] Int. Cl.⁴ ..................... F16H 15/38; F16H 15/08
[52] U.S. Cl. .................................. 74/200; 74/190.5; 74/196
[58] Field of Search ............ 74/198, 200, 196, 190.5, 74/190, 796, 690

[56] References Cited

U.S. PATENT DOCUMENTS

| | | |
|---|---|---|
| 2,446,409 | 8/1948 | Chilton ............................. 74/200 |
| 2,979,970 | 4/1961 | Rounerol .......................... 74/198 |
| 3,163,050 | 12/1964 | Kraus .............................. 74/200 |
| 3,173,312 | 3/1965 | Stockton ........................... 74/200 |
| 3,413,864 | 12/1968 | Magill et al. ...................... 74/200 |
| 3,662,857 | 11/1969 | Perry . | 
| 4,229,986 | 10/1980 | Sharpe ............................. 74/200 |
| 4.272.999 | 6/1981 | Perry . |
| 4,297,918 | 6/1979 | Perry .............................. 74/200 |
| 4,314,485 | 2/1982 | Adams ............................. 74/200 |
| 4,484,487 | 11/1984 | Kraus .............................. 74/200 |
| 4,570,501 | 2/1986 | Perry . |
| 4,576,055 | 3/1986 | Kraus .............................. 74/200 |

FOREIGN PATENT DOCUMENTS 2554037 6/1977 Fed. Rep. of Germany .
1296827 11/1972 United Kingdom .
2018894 4/1979 United Kingdom .
2023753 6/1979 United Kingdom .
2122289 1/1984 United Kingdom .

Primary Examiner—Richard J. Scanlan, Jr.
Assistant Examiner—Peter M. Cuomo
Attorney, Agent, or Firm—Cushman, Darby & Cushman

[57] ABSTRACT

A rolling-traction automotive transmission in which a rotary component is urged axially into contact with a second component by the force exerted by pressurized fluid contained in a space defined between the first and a third component, and in which that space is closed by an annular seal so arranged that the fluid within the space bears radially inwardly upon it, so putting the ring into hoop compression rather than hoop tension. The clearance between the first and third components may be "U"-shaped when viewed in axial section, comprising two limbs meeting at their radially-outward extremity; the first limb may constitute the space in which the force separating the first and third components is generated, and the ring seal may be located in the communicating second limb, in alternative constructions either very close to the outer extremity or more inboard, say at the half-radius. The invention applies particularly to transmissions of the toroidal-race type in which the first component will typically be one of the output discs of the transmission, the second component will be one of the torque-transmitting rollers, and the third will be a reaction member carried by the input shaft.

9 Claims, 1 Drawing Figure

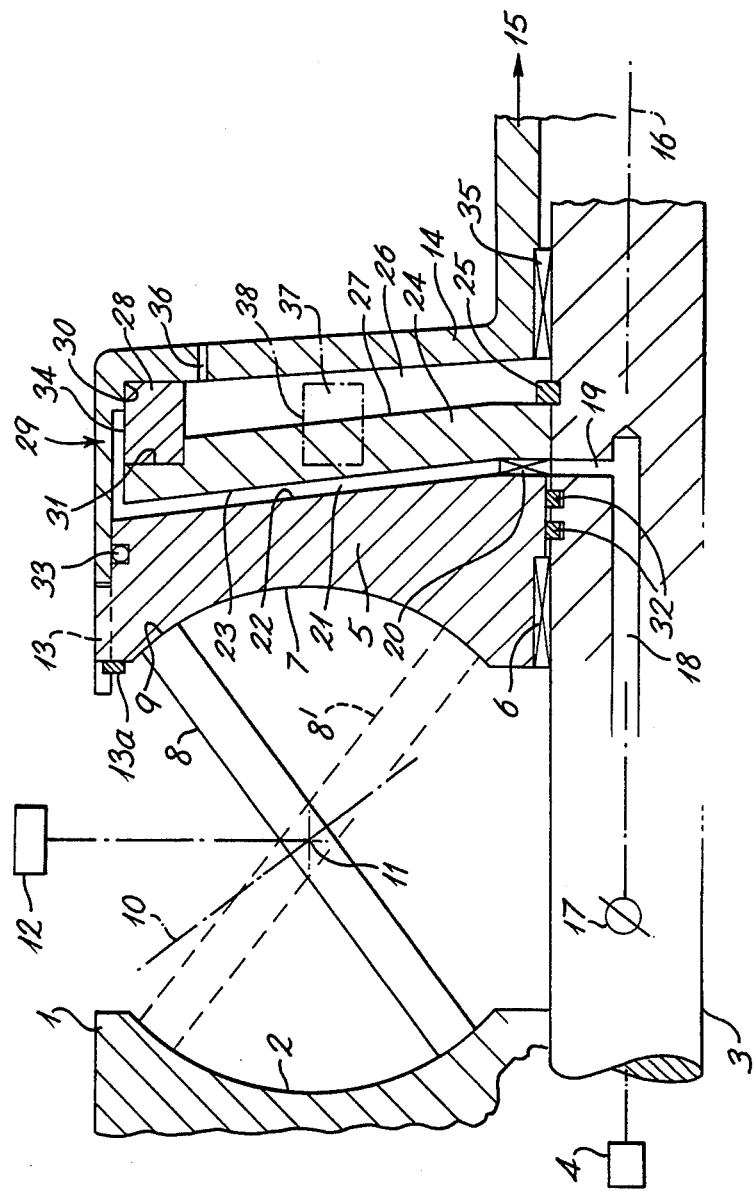

AUTOMOTIVE TRANSMISSIONS OF THE ROLLING TRACTION TYPE

This invention relates to automotive transmissions making use of rolling traction, and in particular to continuously-variable ratio transmissions of that type. It relates especially to the class of transmissions falling within this general type and known as toroidal race rolling traction transmissions, in which the drive is transmitted between coaxial and confronting input and output discs. The two confronting disc faces are each formed with an annular groove of arcuate section, the two confronting grooves together forming part of the surface of the imaginary torus coaxial with the discs. Rollers, whose axes intersect the torus centre circle substantially at right angles, roll in contact with both races and transmit drive from the input to the output disc so that the two discs rotate in opposite directions. By altering the setting of such a roller, so that the ratio changes between the radii at which it makes contact with the two discs, the transmitted ratio is varied also. Such transmissions, by now the subject of many published patents and patent applications, may be subdivided into two classes. Firstly so-called single-ended units in which a single input disc confronts a single output disc to which it is connected by a single set of rollers of the kind already described. Secondly so-called double-ended units in which a single output disc is formed with two races, one of each on its opposite faces, and is located between two oppositely-facing input discs driven in common; a first set of rollers connect one output race to one of the input discs, and a second set transmits drive from the second input disc to the secon race of the output disc, the two sets of rollers of course being controlled so that they transmit the same ratio at all times. By way of example, such double-ended transmissions are described in U.S. Pat. specifications Nos. 4,272,999 and 4,297,918, and single-ended transmissions are described in U.S. Pat. specification No. 3,662,857 and in pending U.S. application Ser. No. 507,035, now U.S. Pat No. 4,570,501.

Crucial to the effective operation of such transmission over their full ranges of speed and torque is the maintenance of a considerable and controllable axial force, generally known as the "end load", urging each input race and corresponding output race axially towards each other and so into contact with the intervening set of rollers. It is now customary to generate such end loads hydraulically by supplying fluid under pressure into a cylinder which is coaxial with the discs and in which one of the discs moves as the piston. The present invention relates particularly to the problem of providing an effective and reliable rotary seal to prevent escape of high pressure fluid from the gap between such a combination of piston and cylinder. The problem exists in double-ended units, in which the force usually acts to urge the two input discs to converge upon each other and sandwich the single output disc and two sets of rollers between them: here, as shown for instance in specifications U.S. Pat. Nos. 4,272,999 and 4,297,918, the input discs are spline-keyed to an input shaft and one of those discs acts as a piston movable within a cylinder fixed to the shaft. In a single-ended unit however the problem tends to be worse because it is often convenient to make the piston fast with one of the discs—say the output disc—and the cylinder fast with the other. The seal is therefore subjected in use to a high rubbing speed because the two parts between which it is effective are both rotating, and in opposite directions.

It has furthermore been customary, as the previous paragraphs have implied, for the end load seal to be in the form of a ring located between coaxial cylindrical surfaces. Such a seal, while simple in principle, has the disadvantage of generating tensile stresses in the sealing member.

The present invention is based upon realising that by making a relatively minor change in hardware shape it is possible to use a member which is subjected in use to compressive forces, preferably hoop compressive forces, to seal the space in which the end load is generated. Broadly stated the invention is a rolling traction automotive transmission in which a rotary first component must be subjected to an axial force to urge it into rolling contact with a second component, in which force is provided by pressurised fluid in an annular space which is coaxial with the first component and of which that component constitutes one of the axial boundaries while a third component constitutes the other such boundary, in which the space is sealed by ring seal spanning the gap between the first and third components, and in which that seal is so arranged that the fluid bears against it in a radially-inward direction relative to the first component, so putting the seal into compressive hoop stress. The seal may be of the known face-seal type, riding on an oil film.

Preferably the transmission is of the toroidal-race rolling traction type in which the first component is one of the transmission discs and the second component is one of the rollers, change in the orientation of which operates to change the transmitted ratio. The first component may be an output disc of the transmission and the third component may be fixed to the input shaft.

The clearance between the first and third components when viewed in axial section may have the appearance of two substantially radial limbs meeting at a "U"-bend at their radially-outward extremity, the first limb being radially-longer than the second and constituting the said space in which the said force is generated, with the ring seal closes the free end of the second limb.

The radial length of the second limb may be very small, so that the working face of the ring seal lies at substantially the same radius as the "U"-bend; alternatively the second limb may be of substantial length, so that the working face of the ring seal lies at a radius which is a fraction, for instance not less than one half, of the radial extent of the first limb.

Pressurized fluid may enter the space through an inlet at the radially-inward end of the first limb, fluid may reach the inlet by way of communicating conduits formed within the input shaft, and the ring seal may be fixed to the first component and have an interface with the third component.

The invention will now be described, by way of example, with reference to the acompanying drawing which is a simplified axial section through part of a toroidal-race, continuously-variable ratio transmission.

An input disc 1, formed with a toroidal race 2, is keyed to an input shaft 3 collected to a prime mover shown schematically at 4. The transmission is of the so-called single-ended type and so comprises a single output disc 5, supported on shaft 3 by a rotary bearing 6 and thus able to rotate relative to that shaft. Output disc 5 presents a toroidal race 7 and a set of rollers 8, of which only one is shown, rotate with their rims 9 in contact with races 2 and 7 to transmit rotary drive from input disc 1 to output disc 5, with a reversal of the sense of rotation. Illustrated roller 8, whose axis 10 substantially intersects the centre circle 11 of the torus to which races 2 and 7 belong, is shown contacting race 2 at a relatively small radius and race 7 at a relatively large one. This setting of the rollers 8 is therefore appropriate to a low ratio setting of the transmission as a whole. Mechanism shown schematically at 12 is operable to change the setting of the rollers so that their axes rotate as radii about the circle 11, to the opposite extreme position shown in broken lines at 8' where the transmission is in high ratio.

A spline 13 connects output disc 5 to a bell-shaped output member 14 which in turn is connected to the final output member of the unit as a whole, indicated schematically at 15. Any leftwards thrust of member 14 is taken by a circlip 13a.

A force, acting in a direction parallel to the axis 16 of shaft 3, must be generated to urge discs 1 and 5 axially together and thus generate adequate reaction to transmit torque between each race and the intervening rollers 8. This force is generated by high pressure fluid supplied from a source 17 and passing by way of conduits 18, 19 formed within shaft 1 and through a thrust bearing 20 into a generally disc-shaped space 21. Bearing 20 lies at the inner radial edge of this space, one of the walls of the space is constituted by the rear face 22 of output disc 5, and the opposite wall 23 is presented by a solid disc 24 fixed to shaft 3 by a collar 25. Viewed in axial section as in the drawing, it will be seen that a second generally disc-like space 26 is defined between the inner wall of the output bell 14 and the opposite wall 27 of disc 24, and that in the absence of a face seal 28 the two spaces 21, 26 would form the two limbs of a continuous "U"-shaped passage with the bend or turn 29 of the "U" located at the outer radial extemity. Seal 28 is fixed in a corner 30 of output bell 14, and makes rubbing and sealing contact with a machined notch 31 formed around the rim of wall 27 of disc 24. While piston rings 32 and an "O"-ring 33 have only a routine anti-leakage operation and are located either between relatively-stationary parts (33) or at small radius (32), seal 28 effectively closes the outer extremity of space 21 and must withstand the full pressure within that space. According to the invention it does so effectively because that pressure acts predominantly upon the radially-outer face 34 of the seal, so putting the seal into hoop compression and relieving the design problems of the mechanical seal components.

Bearings 6 and 35 support output disc 5 and output member 14 upon shaft 3 in such a manner that they are free to rotate and also to make limited axial movement. Disc 24 is however rigidly fixed to shaft 3. It follows that as fluid pressure within space 21 rises, the tendency will be for the space to expand axially, so that disc 5 tends to move to the left, so "compressing" the torus of which races 2 and 7 form part and so increasing the force of reaction between the rollers 8 and the two races. A bleed 36 ensures that space 26 is at ambient pressure, and allows the escape from that space of any fluid that seeps past the engagement between seal 28 and the faces of notch 31.

Seal 28 is shown in full lines at the radially-outermost position it can have if its reaction with the fluid is to put it into hoop compression, as the invention requires. For any given fluid pressure required within space 22 in order to generate a particular force of reaction between races 2, 7 and rollers 8, this position of ring 28 exposes the seal to minimum pressure, but to the maximum rubbing speed because of the maximum possible radius. If instead the ring were located at the alternative position within space 26 indicated in broken lines 37, that is to say at about half the previous radius, the rubbing speed (which varies linearly with radius) would be about half of its former value. However only that fraction of the fluid within space 22 that lies radially-inboard of the operating face 38 of the seal will now exert a net leftwards force upon face 22. The fluid pressure, being inversely proportional to the square of the radius over which it effectively acts, will therefore have to be four times what it was before. The radial location of the seal 28 must therefore be a compromise between seal surface rubbing speed and fluid pressure, as well as other obvious parameters such as cost.

It will be appreciated that the seal is shown schematically in position 37; detailed design to ensure adequate fixing to member 14 and effecient rubbing sealing against disc 24 and presentation of the operating face 34 are within the competence of the man in the art.

What is claimed is:

1. A rolling traction automotive transmission comprising:
    a rotary first component;
    second and third components;
    means to generate an axial force to urge the said rotary first component into rolling contact with said second component, said means comprising a clearance between said first and said third components, which clearance includes an annular chamber coaxial with the said first component and adapted to be filled with pressurized fluid;
    a first axially-facing bounding surface of said chamber, presented by said first component;
    a second axially-facing bounding surface of said chamber, presented by said third component;
    a ring seal presenting a sealing face which provides a third bounding surface of said chamber and bridges the said clearance between said first and third components;
    said sealing face facing radially-outwardly relative to said first component, so that pressurized fluid within said chamber bears radially-inwardly relative to said first component against said ring seal, so putting said ring seal into compressive hoop stress.

2. A transmission according to claim 1 of toroidal-race rolling traction type having a variable ratio comprising at least one input disc, at least one output disc, and variable-orientation rollers that contact and transmit drive from a said input disc to a said output disc, in which said first component is one of said discs and said second component is one of said rollers, said variation in the orientation of which operates to change the ratio of said tranmission.

3. A toroidal-race rolling traction transmission according to claim 2 comprising an input shaft to which any said input discs are connected, in which said second component is a said output disc of the transmission and said third component is fixed to said input shaft.

4. A transmission according to claim 1 in which said clearance between said first and third components when viewed in axial section relative to said first component has the appearance of first and second substantially radial limbs meeting at a "U"-bend at their radially-outward extremity, said second limb having a free end in which said first limb is radially-longer than said second limb and provides the said chamber in which the said force is generated, and in which said ring seal closes the free end of said second limb.

5. A transmission according to claim 4 in which said second limb has a radial length which is very small, so that said sealing face of said ring seal lies close to said "U"-bend.

6. A transmission according to claim 4 in which said second limb is of substantial length, so that said sealing face of said ring seal lies at a radius which is a fraction, for instance not less than one half, of the radial extent of said first limb.

7. A transmission according to claim 4 including said first limb having a radially-inward end and inlet means by which pressure fluid enters said chamber at the radially-inward end of said first limb.

8. A transmission according to claim 7 including an input shaft to which said third component is fixed, and conduits formed within said input shaft and by means of which said fluid reaches said inlet means.

9. A transmission according to claim 1 in which said ring seal is fixed to said first component and has an interface with said third component.

* * * * *